US009999093B2

(12) United States Patent
Tan et al.

(10) Patent No.: US 9,999,093 B2
(45) Date of Patent: Jun. 12, 2018

(54) METHOD, APPARATUS AND COMPUTER-READABLE MEDIUM FOR UPDATING CONNECTION PARAMETER OF LOW-POWER BLUETOOTH DEVICE

(71) Applicant: Xiaomi Inc., Beijing (CN)

(72) Inventors: Kangxi Tan, Beijing (CN); Jun Zhang, Beijing (CN); Xin Liang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days. days.

(21) Appl. No.: 15/333,526

(22) Filed: Oct. 25, 2016

(65) Prior Publication Data

US 2017/0164420 A1    Jun. 8, 2017

(30) Foreign Application Priority Data

Dec. 4, 2015  (CN) .......................... 2015 1 0885741

(51) Int. Cl.
*H04W 4/00* (2018.01)
*H04W 84/12* (2009.01)
(Continued)

(52) U.S. Cl.
CPC ............ *H04W 76/25* (2018.02); *G08C 17/02* (2013.01); *H04W 4/008* (2013.01); *H04W 4/80* (2018.02);
(Continued)

(58) Field of Classification Search
USPC ...... 455/41.2, 458, 574, 343.1, 452.1, 452.2
See application file for complete search history.

(56) References Cited

U.S. PATENT DOCUMENTS

2006/0031553 A1* 2/2006 Kim .................. H04L 29/06027
709/231
2006/0100002 A1* 5/2006 Luebke ................. G06F 3/0362
455/574
(Continued)

FOREIGN PATENT DOCUMENTS

CN          101030978 A      9/2007
CN          103687019 A      3/2014
(Continued)

OTHER PUBLICATIONS

International Search Report of PCT/CN2016/090504, dated Oct. 26, 2016.
(Continued)

*Primary Examiner* — Ganiyu A Hanidu
(74) *Attorney, Agent, or Firm* — Finnegan, Henderson, Farabow, Garrett & Dunner LLP

(57) ABSTRACT

A method is provided for updating a connection parameter of a low-power Bluetooth device. The method includes, upon detection of a local switch of remote control modes, transmitting, to a controlled device, a prompt message indicating the local switch, such that a request for updating a connection parameter is generated based on the prompt message and transmitted to a Bluetooth remote control device. A valid time for the connection parameter is carried in the request, and is earlier than a default valid time. The method also includes monitoring, for every connection interval after the local switch, whether the request is received locally. The method also includes upon detection of the request, transmitting, to the controlled device, a response for agreeing to update the connection parameter. The method further includes updating the connection parameter between the Bluetooth device and the controlled device, when the valid time for the connection parameter arrives.

18 Claims, 15 Drawing Sheets

(51) Int. Cl.
*H04W 88/06* (2009.01)
*G08C 17/02* (2006.01)
*H04W 24/02* (2009.01)
*H04W 76/04* (2009.01)
*H04W 84/18* (2009.01)

(52) U.S. Cl.
CPC ......... *H04W 24/02* (2013.01); *H04W 76/045* (2013.01); *H04W 84/12* (2013.01); *H04W 88/06* (2013.01); *G08C 2201/12* (2013.01); *H04W 84/18* (2013.01); *Y02B 60/50* (2013.01); *Y02D 70/00* (2018.01)

(56) References Cited

U.S. PATENT DOCUMENTS

| | | | |
|---|---|---|---|
| 2008/0102861 A1* | 5/2008 | Linsky | H04W 76/021 455/458 |
| 2009/0089856 A1* | 4/2009 | Bangor | H04B 1/202 725/151 |
| 2011/0021142 A1 | 1/2011 | Desai et al. | |
| 2013/0090061 A1* | 4/2013 | Linde | H04W 8/005 455/41.2 |
| 2015/0071216 A1 | 3/2015 | Ilsar et al. | |
| 2015/0283703 A1* | 10/2015 | Izhikevich | B25J 9/163 706/11 |
| 2017/0093727 A1* | 3/2017 | Chen | H04W 72/1242 |
| 2017/0164420 A1 | 6/2017 | Tan et al. | |

FOREIGN PATENT DOCUMENTS

| | | |
|---|---|---|
| CN | 104601203 A | 5/2015 |
| CN | 104639968 A | 5/2015 |
| CN | 105451369 A | 3/2016 |

OTHER PUBLICATIONS

Extended European Search Report of European Patent Application No. 16193662.0, from the European Patent Office, dated Apr. 5, 2017.

"Specification of the Bluetooth® System," Version 4.2, dated Dec. 2, 2014, Bluetooth SIG, XP055359393, URL:https:/www.bluetooth.com/specifications/adopted-specifications [retrieved on Mar. 28, 2017].

"21400457: Use shorter "instant" when updating Bluetooth LE connection parameters," (LL_CONNECTION_UPDATE_REQ), Issue #873, dated Aug. 3, 2015, URL: https://github.com/lionheart/openradar-mirror/issues/873 [retrieved on Mar. 28, 2017].

Mikhaylov Konstantin Mikhaylov, "Accelerated Connection Establishment (ACE) Mechanism for Bluetooth Low Energy," dated Sep. 2, 2014, pp. 1264-1268, 2014 IEEE 25th Annual International Symposium on Personal, Indoor and Mobile Radio Communications (PIMRC), IEEE, XP032789549, DOI: 10.1109/PIMRC.2014.7136362 [retrieved on Jun. 25, 2015].

"Quick connection parameters update," dated Aug. 1, 2014, Nordic Semiconductors—Developer Zone, XP055359308, URL: https://devzone.nordicsemi.com/question/14519/quick-connection-parameters-update/ [retrieved on Mar. 28, 2017].

* cited by examiner

METHOD, APPARATUS AND COMPUTER-READABLE MEDIUM FOR UPDATING CONNECTION PARAMETER OF LOW-POWER BLUETOOTH DEVICE

CROSS-REFERENCE TO RELATED APPLICATIONS

This application claims priority to Chinese Patent Application No. 201510885741.7, filed Dec. 4, 2015, which is incorporated herein by reference in its entirety.

TECHNICAL FIELD

The present disclosure generally relates to communication technology, and more particularly, to method, apparatus and computer-readable medium for updating a connection parameter of a low-power Bluetooth device.

BACKGROUND

With the continuous development of Bluetooth technology, BLE (Bluetooth Low Energy) techniques supported by Bluetooth 4.0 protocol have been widely applied to the field of wireless remote control, which enable more and more functions to be included in Bluetooth remote control devices. It can be seen from the Bluetooth 4.0 protocol that three connection parameters, namely, Connection Interval, Slave Latency, and Supervision Timeout, determine the power consumption and data transmission capacity of a Bluetooth remote control device.

In related art, a Bluetooth remote control device may initiate a dialog for updating a connection parameter with a controlled device that is communicatively connected with the Bluetooth remote control device after a number (Slave Latency) of Connection Intervals. This results in slow updating of the connection parameter, thereby affecting power consumption and data transmission capacity of the Bluetooth remote control device.

SUMMARY

In view of the deficiency in related arts, method, apparatus and computer-readable medium for updating a connection parameter of a low-power Bluetooth device are provided in the disclosure.

In particular, the present disclosure is to be implemented through the following technical solutions.

According to a first aspect of the present disclosure, a method is provided for updating a connection parameter of a low-power Bluetooth device. The method is performed by a Bluetooth remote control device that is communicatively connected with a controlled device. The method includes, upon detection of a local switch of remote control modes, transmitting, to the controlled device, a prompt message indicating the local switch of remote control modes in the Bluetooth remote control device, such that a request for updating a connection parameter is generated by the controlled device based on the prompt message and transmitted to the Bluetooth remote control device. A valid time for the connection parameter is carried in the request for updating the connection parameter, and is earlier than a default valid time. The method also includes monitoring, for every connection interval Connection Interval after the local switch of remote control modes, whether the request for updating the connection parameter transmitted by the controlled device is received locally. The method also includes upon detection of the request for updating the connection parameter, transmitting, to the controlled device, a response for agreeing to update the connection parameter. The method further includes updating the connection parameter between the Bluetooth remote control device and the controlled device, when the valid time for the connection parameter arrives.

According to a second aspect of the present disclosure, a method is provided for updating a connection parameter of a low-power Bluetooth device. The method is performed by a Bluetooth remote control device that is communicatively connected with a controlled device. The method includes, upon detection of a local switch of remote control modes, transmitting, to the controlled device, a request for updating a connection parameter. The method also includes monitoring, for every connection interval Connection Interval after the local switch of remote control modes, whether a response for agreeing to update the connection parameter transmitted by the controlled device is received locally. A valid time for the connection parameter is carried in the response, and is earlier than a default valid time. The method further includes updating, after the response is received, the connection parameter between the Bluetooth remote control device and the controlled device, when the valid time for the connection parameter arrives.

According to a third aspect of the present disclosure, an apparatus is provided for updating a connection parameter of a low-power Bluetooth device. The apparatus is applied to a Bluetooth remote control device that is communicatively connected with a controlled device. The apparatus includes a memory for storing processor-executable instructions. The apparatus also includes a processor configured for executing the instructions to, upon detection of a local switch of remote control modes, transmit, to the controlled device, a prompt message indicating the local switch of remote control modes in the Bluetooth remote control device, such that a request for updating a connection parameter is generated by the controlled device based on the prompt message and transmitted to the Bluetooth remote control device. A valid time for the connection parameter is carried in the request for updating the connection parameter, and is earlier than a default valid time. The processor is also configured for executing the instructions to monitor, for every connection interval Connection Interval after the local switch of remote control modes, whether the request for updating the connection parameter transmitted by the controlled device is received locally. The processor is also configured for executing the instructions to, upon detection of the request for updating the connection parameter, transmit, to the controlled device, a response for agreeing to update the connection parameter. The processor is further configured for executing the instructions to update the connection parameter between the Bluetooth remote control device and the controlled device, when the valid time for the connection parameter arrives.

According to a fourth aspect of the present disclosure, an apparatus is provided for updating a connection parameter of a low-power Bluetooth device. The apparatus is applied to a Bluetooth remote control device that is communicatively connected with a controlled device. The apparatus includes a memory for storing processor-executable instructions. The apparatus also includes a processor configured to execute the instructions to transmit, to the controlled device, a request for updating a connection parameter upon detection of a local switch of remote control modes. The processor is also configured to execute the instructions to monitor, for every connection interval Connection Interval after the local switch of remote control modes, whether a response for agreeing to update the connection parameter transmitted by the controlled device is received locally. A valid time for the connection parameter is carried in the response, and is earlier than a default valid time. The processor is further configured to execute the instructions to update, after the response is received, the connection parameter between the Bluetooth remote control device and the controlled device, when the valid time for the connection parameter arrives.

It is to be understood that the above general description and the following detailed description are merely for the purpose of illustration and explanation, and are not intended to limit the scope of the protection of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

With the continuous development of Bluetooth technology, BLE (Bluetooth Low Energy) techniques supported by Bluetooth 4.0 protocol have been widely applied to the field of wireless remote control. In addition to supporting traditional button remote control modes, Bluetooth remote control devices also support voice remote control modes. According to specifications in the Bluetooth 4.0 protocol relating to low-power Bluetooth devices, a controlled device that is communicatively connected with the Bluetooth remote control device is required to monitor, for every connection interval (Connection Interval), whether there is data to be transmitted by the Bluetooth remote control device. The Bluetooth remote control device responds with one data packet or an empty packet in a maximum interval equal to Slave Latency (a number) Connection Intervals so as to maintain communication connection.

In related art, the Bluetooth remote control device may initiate a dialog for updating a connection parameter with a controlled device that is communicatively connected with the Bluetooth remote control device after Slave Latency (number) Connection Intervals. This results in slow updating of the connection parameter, thereby affecting power consumption and data transmission capacity of the Bluetooth remote control device. To solve the above problems, the present disclosure provides methods and apparatus for updating a connection parameter of a low-power Bluetooth device.

For ease of understanding, technical schemes provided in the present disclosure are described in combination of the exemplary embodiments set forth herein.

Figure 1:
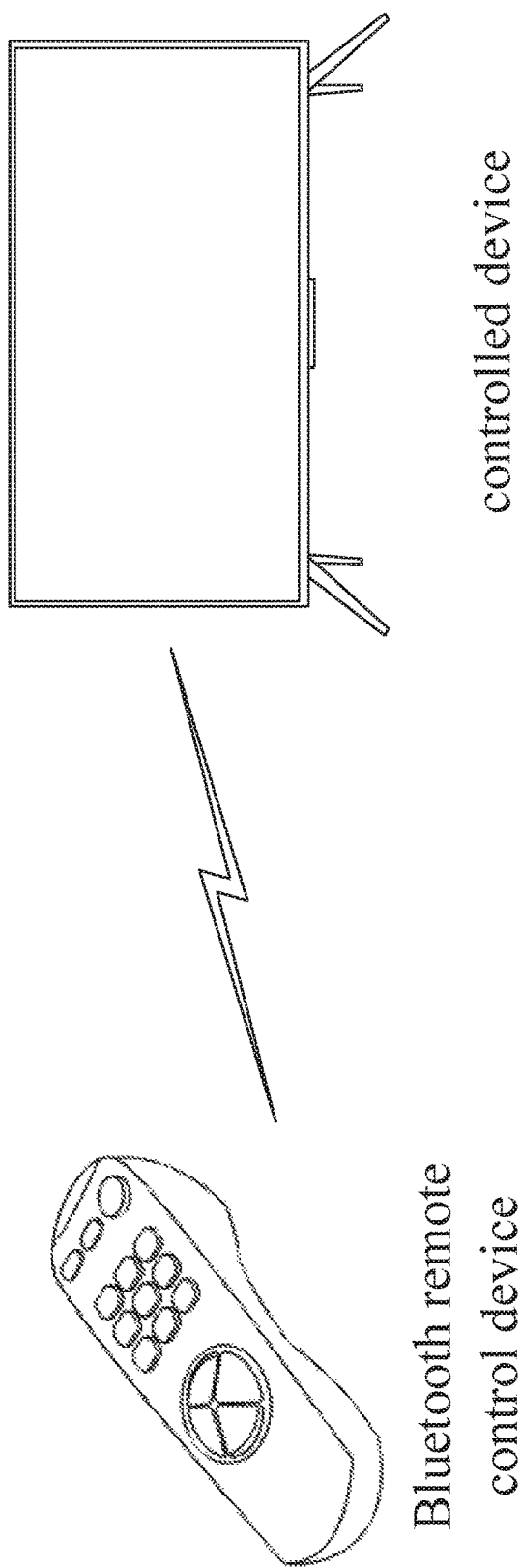
FIG. 1 is an application scenario illustrating a method for updating a connection parameter of a low-power Bluetooth device according to an exemplary embodiment.

FIG. 1 is an application scenario illustrating a method for updating a connection parameter of a low-power Bluetooth device according to an exemplary embodiment. The application scenario includes a Bluetooth remote control device and a controlled device. The Bluetooth remote control device is communicatively connected with the controlled device via a Bluetooth connection. The controlled device may be controlled by the Bluetooth remote control device via a button or voice. The Bluetooth remote control device may include a Bluetooth remote control, a smart phone, a tablet PC and the like, while the controlled device may include a smart TV, a smart air conditioning, a smart bedside lamp, a smart refrigerator and other smart household equipment. The present disclosure does not limit the types of the Bluetooth remote control device and the controlled device.

A method for updating a connection parameter of a low-power Bluetooth device is described below. The method is applied to a Bluetooth remote control device.

Figure 2:
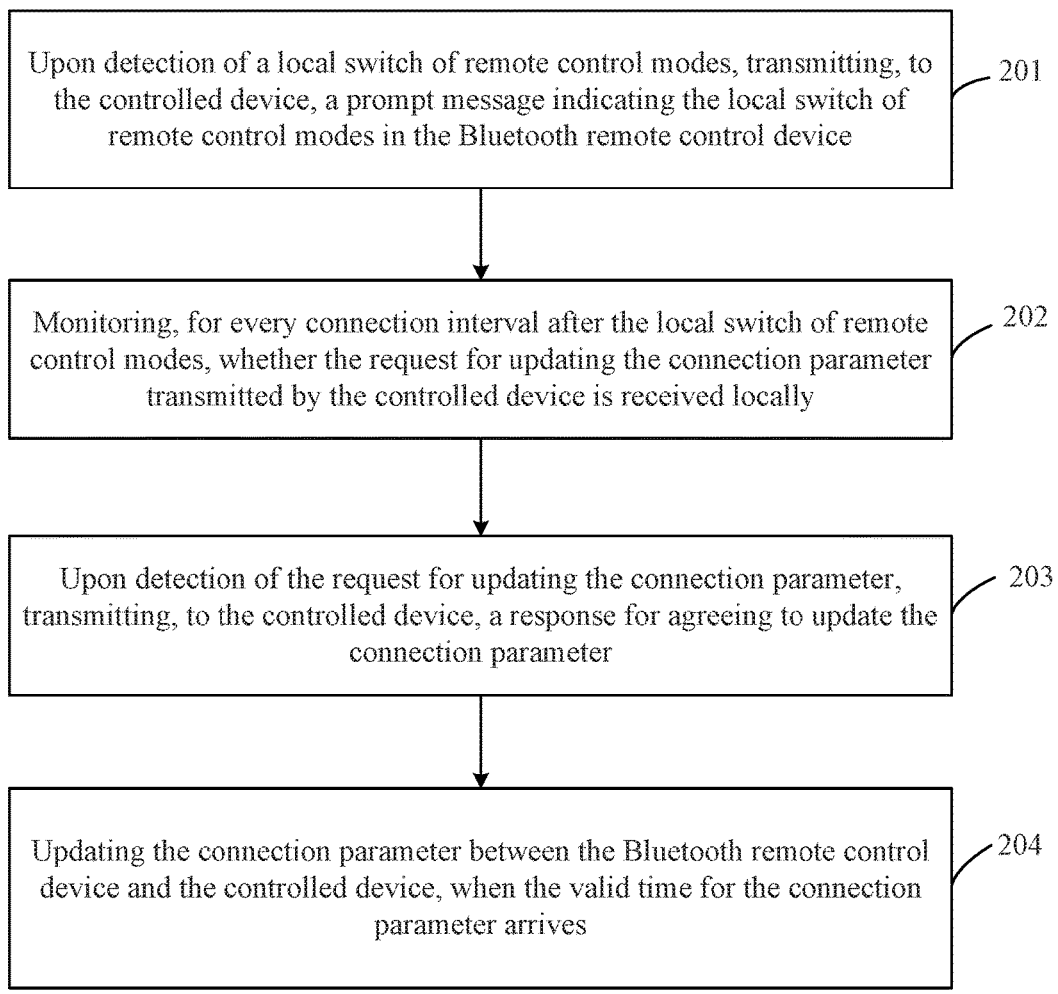
FIG. 2 is a flowchart illustrating a method for updating a connection parameter of a low-power Bluetooth device according to an exemplary embodiment.

FIG. 2 is a flowchart illustrating a method for updating a connection parameter of a low-power Bluetooth device according to an exemplary embodiment. The method is applied to a Bluetooth remote control device that is communicatively connected with a controlled device. The method includes the following steps.

At step 201, upon detection of a local switch of remote control modes, a prompt message is transmitted to the controlled device indicating the local switch of remote control modes in the Bluetooth remote control device. A request for updating a connection parameter is generated by the controlled device based on the prompt message and transmitted to the Bluetooth remote control device. A valid time for the connection parameter is carried in the request for updating the connection parameter, and is earlier than a default valid time.

It should be noted that the remote control mode in this embodiment may include a button remote control mode and a voice remote control mode. The voice remote control mode may be activated by pressing a button dedicated for voice control or inputting a voice command. The present disclosure does not limit the methods of activating the voice remote control mode.

It is to be understood that the amounts of data generated by the Bluetooth remote control device in different remote control modes are generally different. Taking a Bluetooth remote control as an example, a relatively large amount of data (primarily due to the large size of voice data) may be generated by the Bluetooth remote control if voice remote control functions are used by a user, and a relatively small amount of data may be generated by the Bluetooth remote control if only button remote control functions are used by the user.

Because a data packet transmitted from the Bluetooth remote control device to the controlled device has a fixed length, the Bluetooth remote control device may need to perform multiple consecutive transmissions of data packets to the controlled device if the amount of data generated by the Bluetooth remote control device for transmission is relatively large. In this situation, if there is a long communication interval between the Bluetooth remote control device and the controlled device, the complete data may not be transmitted to the controlled device. If there is a small amount of data to be transmitted, the Bluetooth remote control device may transmit data packets in only one transmission. In this situation, if there is a short communication interval between the Bluetooth remote control device and the controlled device, frequent transmissions of data packets to the controlled device will likely consume more power.

In view of the above, systems of the present disclosure determine whether to initiate a dialog for updating a connection parameter with a controlled device by detecting the remote control mode of the Bluetooth remote control device. Upon detecting a switch of remote control modes, the dialog for updating the connection parameter with the controlled device may be initiated, such that the communication interval between the Bluetooth remote control device and the controlled device may be adjusted by adjusting the connection parameter between them.

Still taking a Bluetooth remote control as an example, when it is detected by the Bluetooth remote control that an ordinary button (different from a voice remote control button) of the remote control has been pressed by a user, a prompt message may be transmitted to the controlled device (for example, a smart TV) indicating the press of the ordinary button of the Bluetooth remote control. Upon receipt of the prompt message, a request for updating a connection parameter may be transmitted from the controlled device (e.g., smart TV) to the Bluetooth remote control.

It is to be noted that the following information may be carried in the request for updating connection parameter: information for numerical adjustment of the value of the parameter Connection Interval between the Bluetooth remote control device and the controlled device, information for numerical adjustment of the value of the parameter Slave Latency between the Bluetooth remote control device and the controlled device, or information for numerical adjustment of the parameters Connection Interval and Slave Latency between the Bluetooth remote control device and the controlled device. The present disclosure does not limit the type of information that may be carried in the request for updating connection parameter.

In addition, in related art, the valid time for the connection parameter carried in the request for updating the connection parameter is generally a default time: a number (Slave Latency+M) of Connection Intervals. That is, the controlled device and the Bluetooth remote control device may not update the connection parameter until (Slave Latency+M) Connection Intervals have lapsed after the request for updating the connection parameter was transmitted by the controlled device. In situations where the value of Slave Latency is relatively large, the speed of updating the connection parameter may be relatively slow.

In view of the above situation, in the disclosed embodiments, upon its receipt of the prompt message transmitted by the Bluetooth remote control device, the controlled device may generate a request for updating the connection parameter that carries an earlier valid time. In some embodiments, the valid time for the connection parameter may be M (number) Connection Intervals. That is, the connection parameter may be updated by the controlled device and the Bluetooth remote control device when M Connection Intervals have lapsed after the request for updating the connection parameter was transmitted by the controlled device, thereby saving Slave Latency (number) Connection Intervals. Compared to related art, the disclosed systems and methods improve the speed of updating the connection parameter by making the valid time for the connection parameter earlier than the default valid time.

It is to be noted that because the Bluetooth remote control device may be situated in a chaotic environment with various Bluetooth signals from various other devices, the value of M should not be too small in order to avoid the situation in which the Bluetooth remote control device is unable to receive the content transmitted by the controlled device due to a small value of M. Based on the above consideration, M is usually set as 7. In other embodiments, the value of M may be set by the user as needed. The present disclosure does not limit the value of M.

At step 202, for every connection interval (e.g., Connection Interval) after the local switch of remote control modes, it is monitored whether the request for updating the connection parameter transmitted by the controlled device is received locally.

Upon the switch of remote control modes, the Bluetooth remote control device may monitor whether there is a request for updating a connection parameter from the controlled device at each Connection Interval. That is, the Bluetooth remote control device may perform monitoring at each Connection Interval.

In one embodiment, upon detection of an ordinary button of the Bluetooth remote control being pressed, the Bluetooth remote control may monitor whether there is a request for updating a parameter from the controlled device at each Connection Interval. That is, the Bluetooth remote control may perform monitoring at each Connection Interval.

At step 203, upon detection of the request for updating the connection parameter, a response for agreeing to update the connection parameter is transmitted to the controlled device, such that the connection parameter between the Bluetooth remote control device and the controlled device may be updated when the valid time for the connection parameter arrives.

At step 204, the connection parameter between the Bluetooth remote control device and the controlled device is updated, when the valid time for the connection parameter arrives.

The Bluetooth remote control device may agree to the request for updating the connection parameter from the controlled device upon detection of the request for updating the connection parameter. The Bluetooth remote control device and the controlled device may update the connection parameter between them when the valid time for the connection parameter arrives, such that the connection parameter may be updated in both the Bluetooth remote control device and the controlled device in a relatively short period of time.

In one embodiment, the valid time for the connection parameter carried in the request for updating the connection parameter is 7 Connection Intervals. When the time point at which the request for updating the connection parameter is transmitted from the controlled device to the Bluetooth remote control device is A, then the connection parameter may be updated in both the Bluetooth remote control device and the controlled device at a time point of A+7*(Connection Interval).

In some embodiments, upon detection of a local switch to a button remote control mode by the Bluetooth remote control device and in view of a relatively small amount of data generated in the button remote control mode, step 204 as described above may include: when the valid time for the connection parameter arrives, extending the Connection Interval between the Bluetooth remote control device and the controlled device to a second predetermined duration.

In the disclosed embodiments, the communication interval between the Bluetooth remote control device and the controlled device may be lengthened by extending the Connection Interval between them when the Bluetooth remote control device is in a button remote control mode, such that a low power consumption state of the Bluetooth remote control device is maintained while a basic data transmission capability of the Bluetooth remote control device is realized.

It can be seen from the above that the disclosed systems determine whether the connection parameter is updated by detecting the remote control mode of the Bluetooth remote control device. Upon detection of a switch of remote control modes, a related prompt message may be immediately transmitted to the controlled device. A dialog for updating the connection parameter from the controlled device may be monitored at every Connection Interval. By improving the response speed of the Bluetooth remote control device, the speed of updating the connection parameter is improved.

Figure 3:
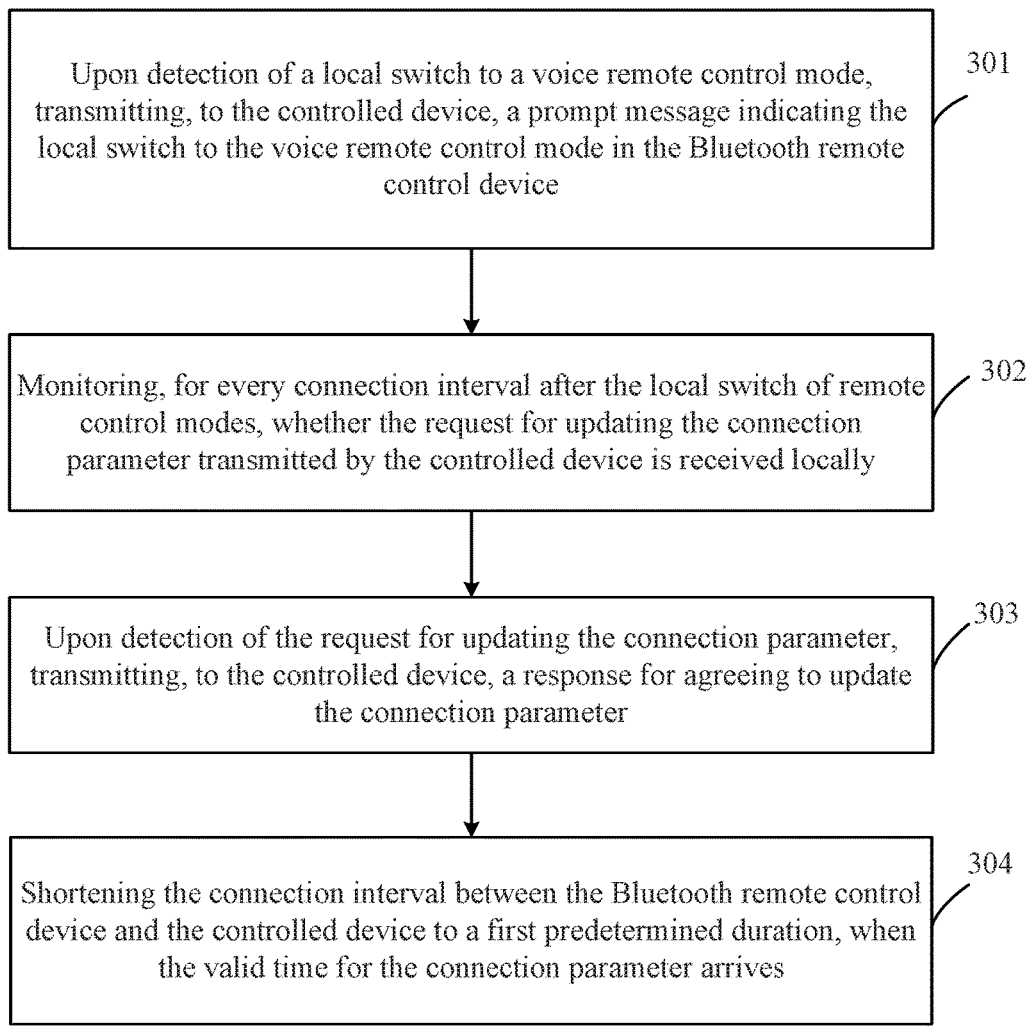
FIG. 3 is another flowchart illustrating a method for updating a connection parameter of a low-power Bluetooth device according to an exemplary embodiment.

FIG. 3 is another flowchart illustrating a method for updating a connection parameter of a low-power Bluetooth device according to an exemplary embodiment. The method is applied to a Bluetooth remote control device that is communicatively connected with a controlled device. When there is a switch to a voice remote control mode, the method includes the following steps.

At step 301, upon detection of a local switch to a voice remote control mode, a prompt message is transmitted to the controlled device indicating the local switch to the voice remote control mode in the Bluetooth remote control device. A request for updating a connection parameter is generated by the controlled device based on the prompt message and transmitted to the Bluetooth remote control device. A valid time for the connection parameter is carried in the request for updating the connection parameter, and is earlier than a default valid time.

Taking a Bluetooth remote control as an example, when it is detected by the Bluetooth remote control that a button for voice control (which is different from ordinary buttons) of the remote control has been pressed by a user, a prompt message indicating a press of the button for voice control of the Bluetooth remote control may be transmitted to the controlled device (for example, a smart TV). Upon receipt of the prompt message, a request for updating a connection parameter may be transmitted from the smart TV to the Bluetooth remote control.

At step 302, for every connection interval (e.g., Connection Interval) after the local switch of remote control mode, it is monitored whether the request for updating the connection parameter transmitted by the controlled device is received locally.

Taking the Bluetooth remote control as an example, after detecting a press of the button for voice control of the Bluetooth remote control, the Bluetooth remote control may monitor whether there is a request for updating the connection parameter from the smart TV at each Connection Interval. That is, the Bluetooth remote control may perform monitoring at each Connection Interval.

At step 303, upon detection of the request for updating the connection parameter, a response for agreeing to update the connection parameter is transmitted to the controlled device, such that the connection parameter between the Bluetooth remote control device and the controlled device may be updated when the valid time for the connection parameter arrives.

At step 304, the Connection Interval between the Bluetooth remote control device and the controlled device is shortened to a first predetermined duration, when the valid time for the connection parameter arrives.

The user may need to input voice information to the Bluetooth remote control device when using the voice remote control mode of the Bluetooth remote control device to control the controlled device. The amount of data for transmission in the voice remote control mode is relatively large compared to that in the button remote control mode.

In the disclosed embodiments, the communication interval between the Bluetooth remote control device and the controlled device may be shortened by shortening the Connection Interval between them when the Bluetooth remote control device is in a voice remote control mode, such that the switch to a short communication interval may be accelerated and a lag in the voice transmission due to slow switching operation may be avoided.

In the disclosed embodiments, after the controlled device receives a message from the Bluetooth remote control device indicating that the voice remote control mode of the Bluetooth remote control device has ended, the controlled device may transmit a request to the Bluetooth remote control device for updating the connection parameter to a previous value. Alternatively or additionally, the connection parameter may be updated to a previous value by the controlled device after the voice remote control mode of the Bluetooth remote control device has ended, such that readjustment of the connection parameter may be avoided next time when the Bluetooth remote control device is used.

In one implementation, when the switch to the voice remote control mode is realized by pressing a button for voice control and the ending of the voice remote control mode is realized by releasing the button for voice control, the above process may include the following steps.

At step S1, upon detection of a release of the button for voice control, the Bluetooth remote control device may transmit, to the controlled device, a prompt message indicating that the button for voice control has been released, such that a first request for updating the connection parameter to a previous value may be generated by the controlled device based on the prompt message and transmitted to the Bluetooth remote control device. A valid time for the connection parameter is carried in the first request for updating the connection parameter, and is earlier than a default valid time.

At step S2, the Bluetooth remote control device may monitor, for every Connection Interval in a second predetermined duration after the release of the button for voice control, whether the first request transmitted by the controlled device is received locally.

Taking the Bluetooth remote control as an example, the Bluetooth remote control may monitor, for every Connection Interval in a certain time period after the release of the button for voice control. For example, the Bluetooth remote control may monitor, for every Connection Interval within hundreds of millisecond after the release of the button for voice control to ensure a quick and timely response to the controlled device.

At step S3, upon detection of the first request, the Bluetooth remote control device may transmit, to the controlled device, a response for agreeing to update the connection parameter.

At step S4, the Bluetooth remote control device may update the connection parameter between the Bluetooth remote control device and the controlled device to the previous value, when the valid time for the connection parameter carried in the first request arrives.

From a perspective of the controlled device, a local Bluetooth chip may be informed that the function of the Bluetooth remote control device to quickly update the connection parameter may not be needed after transmission of the request for updating the connection parameter by the controlled device. The Bluetooth chip may return to a previous mode, i.e., the valid time for updating the connection parameter may return to a default value of (Connection Interval)*(Slave Latency+M).

In another implementation, when the switch to the voice remote control mode is realized by pressing a button for voice control and the ending of the voice remote control mode is realized by releasing the button for voice control, the above process may include the following steps.

At step S1', upon detection of a release of the button for voice control, the Bluetooth remote control device may transmit, to the controlled device, a second request for updating the connection parameter to a preset value.

It is to be noted that the preset value may be interpreted as an appropriate value for the Bluetooth remote control device. In practice, the preset value may be selected according to specific requirements. The present disclosure does not limit the value of the preset value.

At step S2', the Bluetooth remote control device may monitor, for every Connection Interval in a second predetermined duration after the release of the button for voice control, whether a response for agreeing to update the connection parameter to the preset value transmitted by the controlled device is received locally. A valid time for the connection parameter is carried in the response, and is earlier than a default valid time.

At step S3', the Bluetooth remote control device may update, after the response for agreeing to update the connection parameter to the preset value transmitted by the controlled device is received, the connection parameter between the Bluetooth remote control device and the controlled device to the preset value, when the valid time carried in the response arrives.

In view of the fact that the steps of the above two implementations are similar to those of the embodiments illustrated in FIG. 2 and FIG. 3 with the only difference in an adjustment to the value of the connection parameter, details will not be repeated herein.

Corresponding to the method illustrated in FIG. 2 that is applicable to the Bluetooth remote control device, the present disclosure also provides a method for updating a connection parameter of a low-power Bluetooth device that may be applied to the controlled device.

Figure 4:
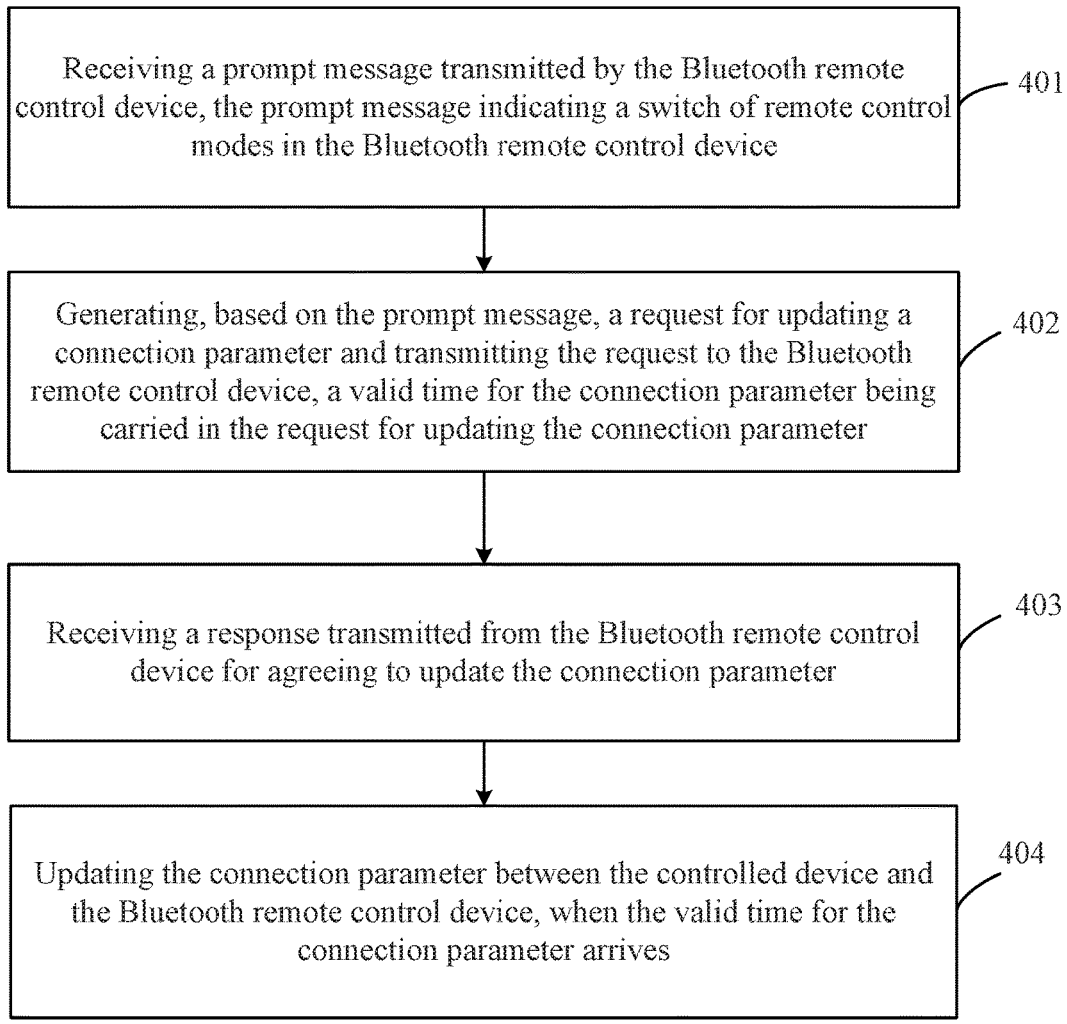
FIG. 4 is another flowchart illustrating a method for updating a connection parameter of a low-power Bluetooth device according to an exemplary embodiment.

FIG. 4 is another flowchart illustrating a method for updating a connection parameter of a low-power Bluetooth device according to an exemplary embodiment. The method is applied to a controlled device that is communicatively connected with a Bluetooth remote control device. The method includes the following steps.

At step 401, the controlled device receives a prompt message transmitted by the Bluetooth remote control device. The prompt message indicates a switch of remote control modes in the Bluetooth remote control device.

In some embodiments, the controlled device may be informed a switch of remote control modes in the Bluetooth remote control device through a prompt message transmitted from the Bluetooth remote control device. Accordingly, after the prompt message is received by the controlled device, a specific remote control mode to which the Bluetooth remote control device has switched may be determined based on an analysis of the prompt message.

At step 402, the controlled device generates, based on the prompt message, a request for updating a connection parameter and transmits the request to the Bluetooth remote control device. A valid time for the connection parameter is carried in the request for updating the connection parameter, and is earlier than a default valid time.

In one implementation, for the purpose of a quick update of the connection parameter, upon detection of a switch of remote control modes (e.g., when detecting press of a button for voice control), the Bluetooth chip in the controlled device may be instructed by the controlled device to bring forward the valid time (e.g., making it earlier) for the connection parameter between the Bluetooth remote control device and the controlled device, while at the same time ensuring no interference to other Bluetooth devices.

At step 403, the controlled device receives a response transmitted from the Bluetooth remote control device for agreeing to update the connection parameter.

At step 404, the controlled device updates the connection parameter between the controlled device and the Bluetooth remote control device, when the valid time for the connection parameter arrives.

In the disclosed embodiments, the connection parameter may be quickly updated by bringing forward the valid time for the connection parameter.

In the methods illustrated in FIGS. 2-4, the connection parameter may be updated based on the request for updating the connection parameter initiated by the controlled device. According to the technical scheme provided herein, the request for updating the connection parameter may alternatively or additionally be initiated by the Bluetooth remote control device. Details of the technical scheme are described below from both the Bluetooth remote control device side and the controlled device side.

Figure 5:
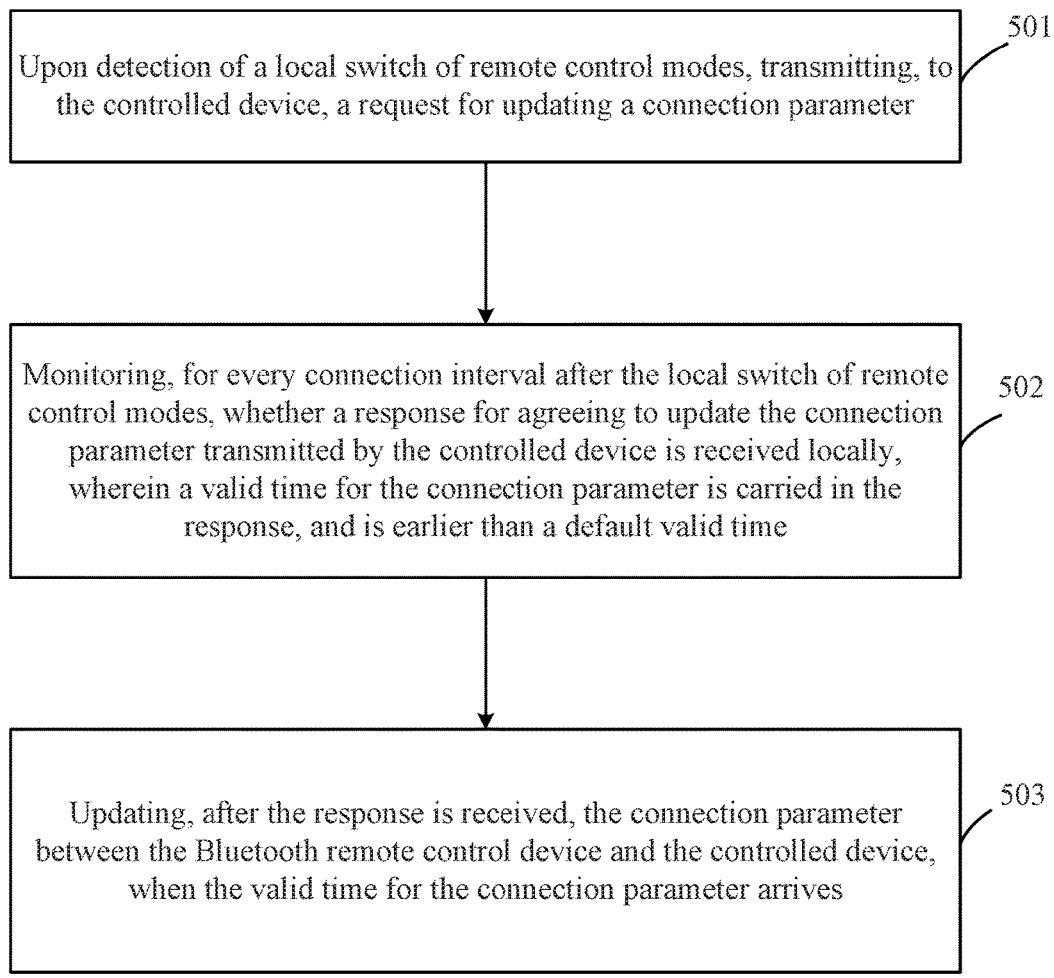
FIG. 5 is another flowchart illustrating a method for updating a connection parameter of a low-power Bluetooth device according to an exemplary embodiment.

FIG. 5 is another flowchart illustrating a method for updating a connection parameter of a low-power Bluetooth device according to an exemplary embodiment. The method is applied to a Bluetooth remote control device that is communicatively connected with a controlled device. The method includes the following steps.

At step 501, upon detection of a local switch of remote control modes, the Bluetooth remote control device transmits, to the controlled device, a request for updating a connection parameter.

For example, upon detection of press of a button for voice control, the Bluetooth remote control device may transmit, to the controlled device, a request for updating a connection parameter.

At step 502, the Bluetooth remote control device may monitor, for every Connection Interval after the local switch of remote control modes, whether a response for agreeing to update the connection parameter transmitted by the controlled device is received locally. A valid time for the connection parameter is carried in the response, and is earlier than a default valid time.

It is to be noted that in the disclosed embodiments, the valid time for the connection parameter is determined by the controlled device.

In view of the fact that the valid time for the connection parameter in this embodiment is set in a way similar to that illustrated in FIGS. 2-4, details will not be repeated herein.

At step 503, the Bluetooth remote control device updates, after the response is received, the connection parameter between the Bluetooth remote control device and the controlled device, when the valid time for the connection parameter arrives.

It can be seen from the above that whether the connection parameter is updated may be determined by detecting the remote control mode of the Bluetooth remote control device. Upon detection of a switch of remote control modes, a request for updating the connection parameter may be transmitted to the controlled device immediately. A related dialog from the controlled device may be monitored at every Connection Interval. In the disclosed embodiments, by improving the response speed of the Bluetooth remote control device, the speed of updating the connection parameter may be improved.

Corresponding to the method illustrated in FIG. 5 that may be applied to the Bluetooth remote control device, the present disclosure also provides a method for updating a connection parameter of a low-power Bluetooth device that may be applied to the controlled device.

Figure 6:
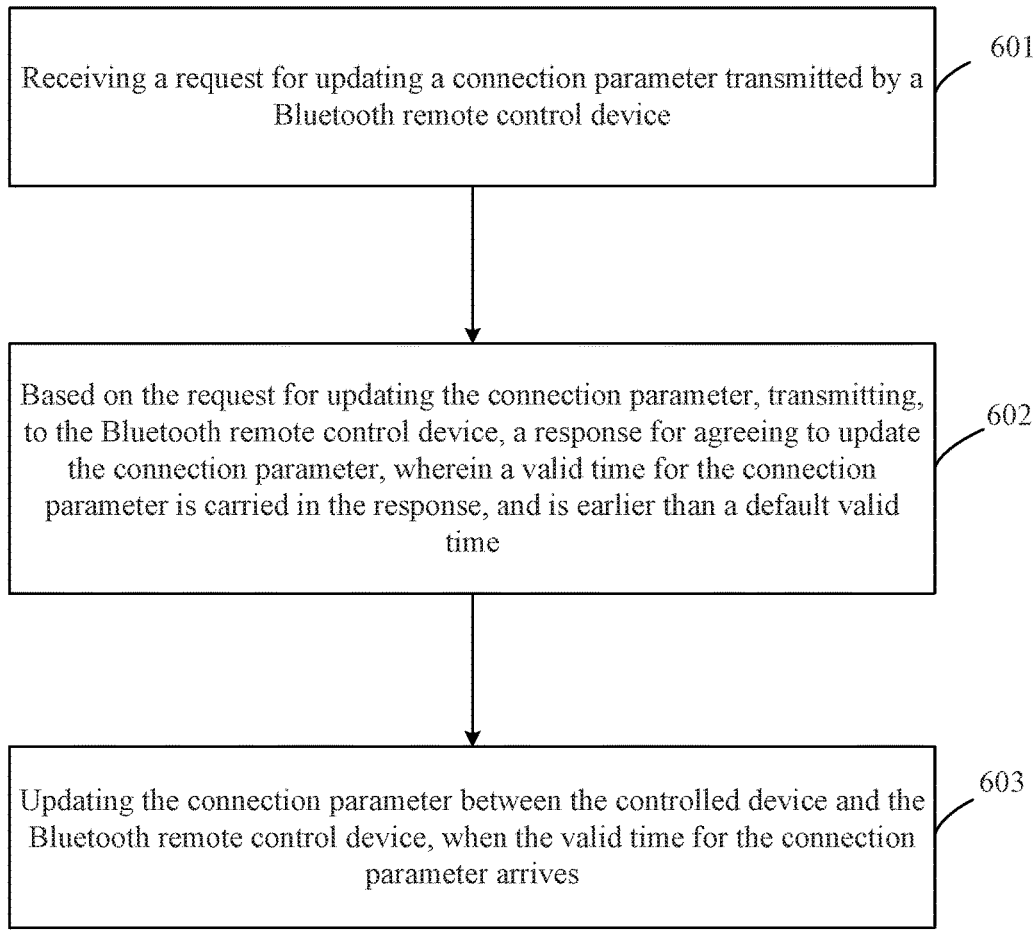
FIG. 6 is another flowchart illustrating a method for updating a connection parameter of a low-power Bluetooth device according to an exemplary embodiment.

FIG. 6 is another flowchart illustrating a method for updating a connection parameter of a low-power Bluetooth device according to an exemplary embodiment. The method is applied to a controlled device that is communicatively connected with a Bluetooth remote control device. The method includes the following steps.

At step 601, the controlled device receives a request for updating a connection parameter transmitted by the Bluetooth remote control device.

At step 602, based on the request for updating the connection parameter, the controlled device transmits, to the Bluetooth remote control device, a response for agreeing to update the connection parameter. A valid time for the connection parameter is carried in the response, and is earlier than a default valid time.

At step 603, the controlled device updates the connection parameter between the controlled device and the Bluetooth remote control device, when the valid time for the connection parameter arrives.

In the disclosed embodiments, the connection parameter may be quickly updated by bringing forward the valid time for the connection parameter.

Corresponding to the embodiment illustrated in FIG. 2 for updating a connection parameter of a low-power Bluetooth device, which may be applied to the controlled device, the present disclosure also provides an apparatus for updating a connection parameter of a low-power Bluetooth device that may be applied to the controlled device.

Figure 7:
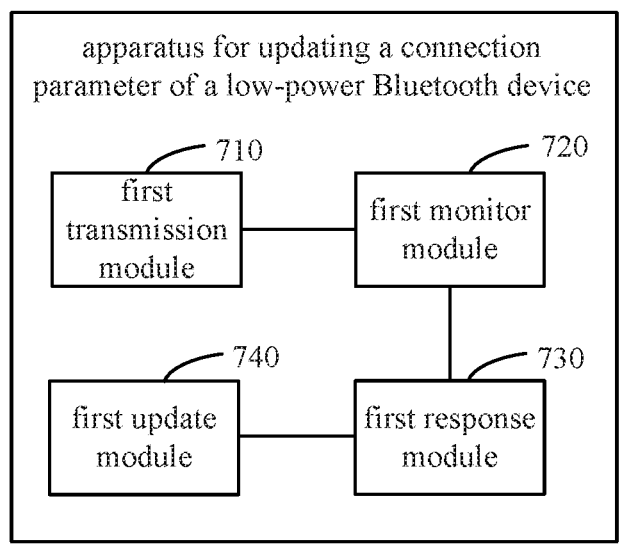
FIG. 7 is a block diagram illustrating an apparatus for updating a connection parameter of a low-power Bluetooth device according to an exemplary embodiment.

FIG. 7 is a block diagram illustrating an apparatus for updating a connection parameter of a low-power Bluetooth device according to an exemplary embodiment. The apparatus may be applied to (e.g., may be part of) a Bluetooth remote control device that is communicatively connected with a controlled device. The apparatus includes a first transmission module 710 configured to transmit, upon detection of a local switch of remote control modes, to the controlled device, a prompt message indicating a switch of remote control modes in the Bluetooth remote control device. A request for updating a connection parameter is generated by the controlled device based on the prompt message and transmitted to the Bluetooth remote control device. A valid time for the connection parameter is carried in the request for updating the connection parameter, and is earlier than a default valid time.

The apparatus shown in FIG. 7 also includes a first monitor module 720 configured to monitor, for every connection interval Connection Interval after the local switch of remote control modes, whether the request for updating the connection parameter transmitted by the controlled device is received locally.

The apparatus shown in FIG. 7 also includes a first response module 730 configured to transmit, upon detection of the request for updating the connection parameter, to the controlled device, a response for agreeing to update the connection parameter.

The apparatus shown in FIG. 7 further includes a first update module 740 configured to update the connection parameter between the Bluetooth remote control device and the controlled device, when the valid time for the connection parameter arrives.

Because the amounts of data generated by the Bluetooth remote control device in different remote control modes are different, and different amounts of data may require different settings of the connection parameter, whether the connection parameter is updated may be determined by detecting the remote control mode of the Bluetooth remote control device. Upon detection of a switch of remote control modes, a related prompt message may be transmitted to the controlled device immediately and a request for updating the connection parameter may be monitored at every Connection Interval. In the disclosed embodiments, by improving the response speed of the Bluetooth remote control device, the speed of updating the connection parameter may be improved.

Figure 8:
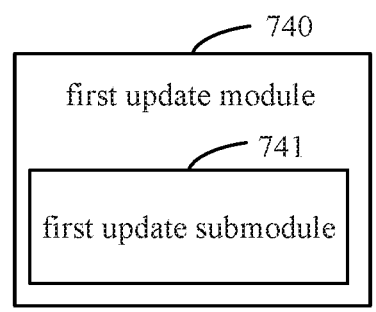
FIG. 8 is another block diagram illustrating an apparatus for updating a connection parameter of a low-power Bluetooth device according to an exemplary embodiment.

FIG. 8 is another block diagram illustrating an apparatus for updating a connection parameter of a low-power Bluetooth device according to an exemplary embodiment. The first update module 740 illustrated in FIG. 7 includes a first update submodule 741 configured to shorten the Connection Interval between the Bluetooth remote control device and the controlled device to a first predetermined duration, upon detection of a local switch to a voice remote control mode.

Figure 9:
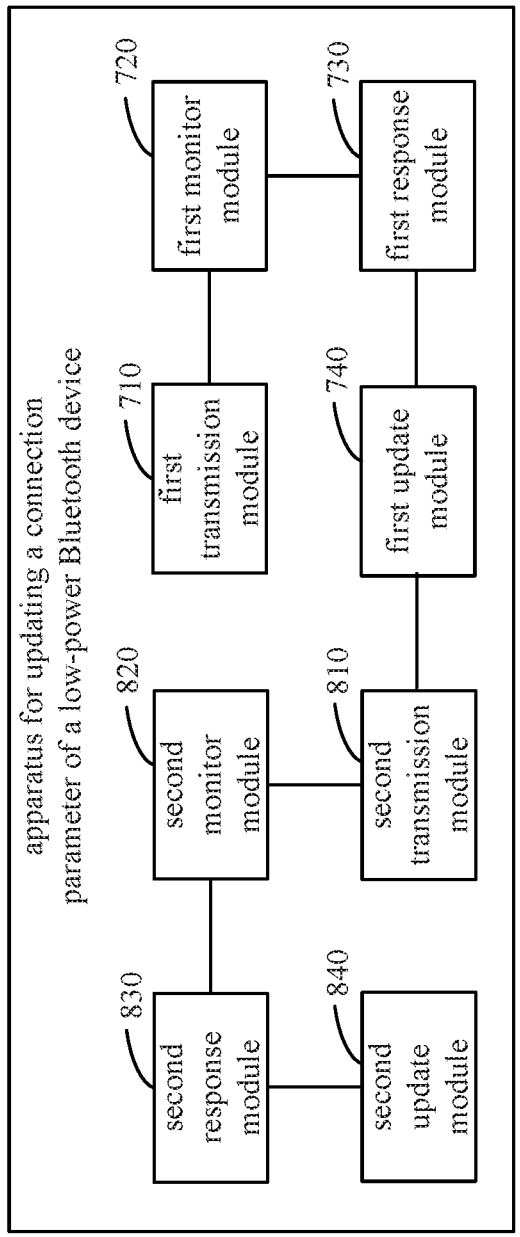
FIG. 9 is another block diagram illustrating an apparatus for updating a connection parameter of a low-power Bluetooth device according to an exemplary embodiment.

FIG. 9 is another block diagram illustrating an apparatus for updating a connection parameter of a low-power Bluetooth device according to an exemplary embodiment. The switch to voice remote control mode is realized by pressing a button for voice control. The apparatus shown in FIG. 9 is based on the apparatus illustrated in FIG. 8, and further includes a second transmission module 810 configured to transmit, upon detection of a release of the button for voice control, to the controlled device, a prompt message indicating that the button for voice control has been released. A first request for updating the connection parameter to a previous value is generated by the controlled device based on the prompt message and transmitted to the Bluetooth remote control device. A valid time for the connection parameter is carried in the first request for updating the connection parameter, and is earlier than a default valid time.

The apparatus shown in FIG. 9 also includes a second monitor module 820 configured to monitor, for every Connection Interval in a second predetermined duration after the release of the button for voice control, whether the first request transmitted by the controlled device is received locally.

The apparatus shown in FIG. 9 also includes a second response module 830 configured to transmit, to the controlled device, a response for agreeing to update the connection parameter upon detection of the first request.

The apparatus shown in FIG. 9 further includes a second update module 840 configured to update the connection parameter between the Bluetooth remote control device and the controlled device to the previous value, when the valid time for the connection parameter carried in the first request arrives.

Figure 10:
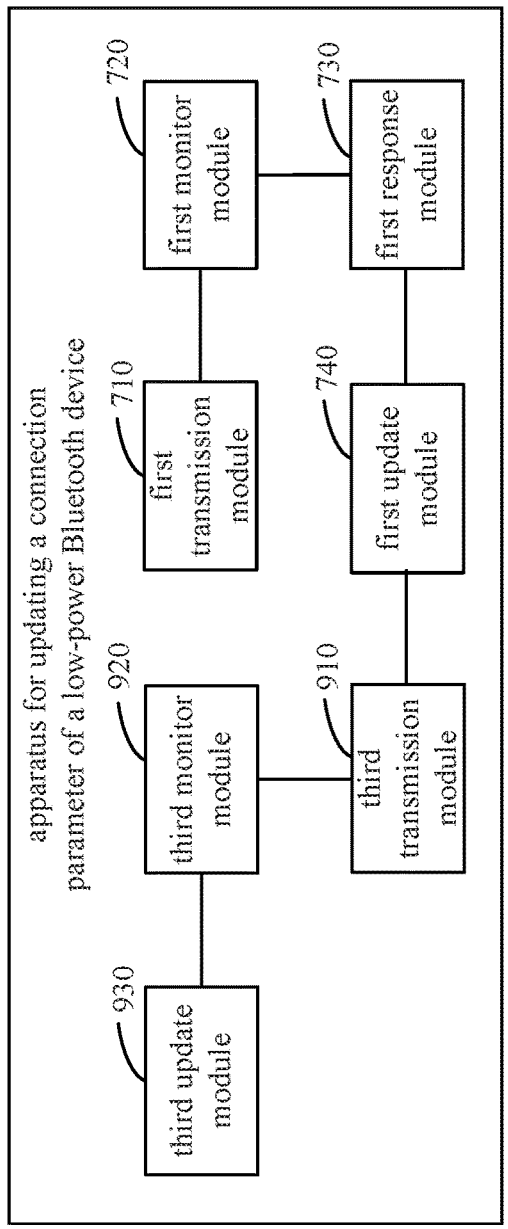
FIG. 10 is another block diagram illustrating an apparatus for updating a connection parameter of a low-power Bluetooth device according to an exemplary embodiment.

FIG. 10 is another block diagram illustrating an apparatus for updating a connection parameter of a low-power Bluetooth device according to an exemplary embodiment. The switch to voice remote control mode is realized by pressing a button for voice control. The apparatus shown in FIG. 10 is based on the apparatus illustrated in FIG. 8, and further includes a third transmission module 910 configured to transmit, upon detection of a release of the button for voice control, to the controlled device, a second request for updating the connection parameter to a preset value.

The apparatus shown in FIG. 10 also includes a third monitor module 920 configured to monitor, for every connection interval Connection Interval in a second predetermined duration after the release of the button for voice control, whether a response for agreeing to update the connection parameter to the preset value transmitted from the controlled device is received locally. A valid time for the connection parameter is carried in the response, and is earlier than a default valid time.

The apparatus shown in FIG. 10 further includes a third update module 930 configured to update, after the response for agreeing to update the connection parameter to the preset value transmitted by the controlled device is received, the connection parameter between the Bluetooth remote control device and the controlled device to the preset value, when the valid time carried in the response arrives.

Figure 11:
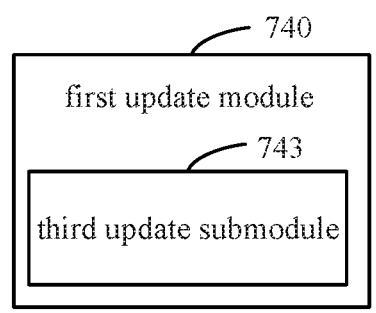
FIG. 11 is another block diagram illustrating an apparatus for updating a connection parameter of a low-power Bluetooth device according to an exemplary embodiment.

FIG. 11 is another block diagram illustrating an apparatus for updating a connection parameter of a low-power Bluetooth device according to an exemplary embodiment. The first update module 740 illustrated in FIG. 7 further includes a third update submodule 743 configured to extend the Connection Interval between the Bluetooth remote control device and the controlled device to a second predetermined duration, upon detection of a local switch to a button remote control mode.

Corresponding to the embodiment for updating the connection parameter that may be applied to the controlled device as illustrated in FIG. 4, the present disclosure also provides an apparatus for updating the connection parameter that may be applied to the controlled device.

Figure 12:
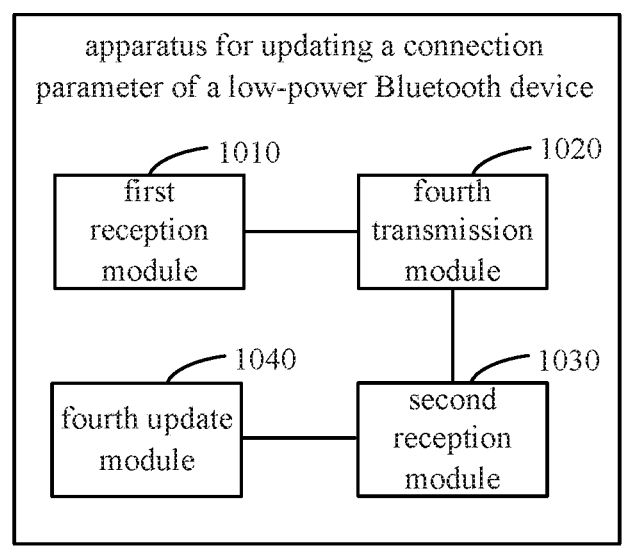
FIG. 12 is another block diagram illustrating an apparatus for updating a connection parameter of a low-power Bluetooth device according to an exemplary embodiment.

FIG. 12 is another block diagram illustrating an apparatus for updating a connection parameter of a low-power Bluetooth device according to an exemplary embodiment. The apparatus may be applied to a controlled device that is communicatively connected with a Bluetooth remote control device. The apparatus includes a first reception module 1010 configured to receive a prompt message transmitted by the Bluetooth remote control device. The prompt message indicates a switch of remote control modes in the Bluetooth remote control device.

The apparatus shown in FIG. 12 also includes a fourth transmission module 1020 configured to generate, based on the prompt message, a request for updating a connection parameter and transmit the request to the Bluetooth remote control device. A valid time for the connection parameter is carried in the request for updating the connection parameter and is earlier than a default valid time.

The apparatus shown in FIG. 12 also includes a second reception module 1030 configured to receive a response for agreeing to update the connection parameter transmitted by the Bluetooth remote control device.

The apparatus shown in FIG. 12 further includes a fourth update module 1040 configured to update the connection parameter between the controlled device and the Bluetooth remote control device, when the valid time for the connection parameter arrives.

In the disclosed embodiments, the connection parameter may be quickly updated by bringing forward the valid time for the connection parameter.

Corresponding to the embodiment for updating the connection parameter that may be applied to the Bluetooth remote control device as illustrated in FIG. 5, the present disclosure also provides an apparatus for updating the connection parameter that may be applied to the Bluetooth remote control device.

Figure 13:
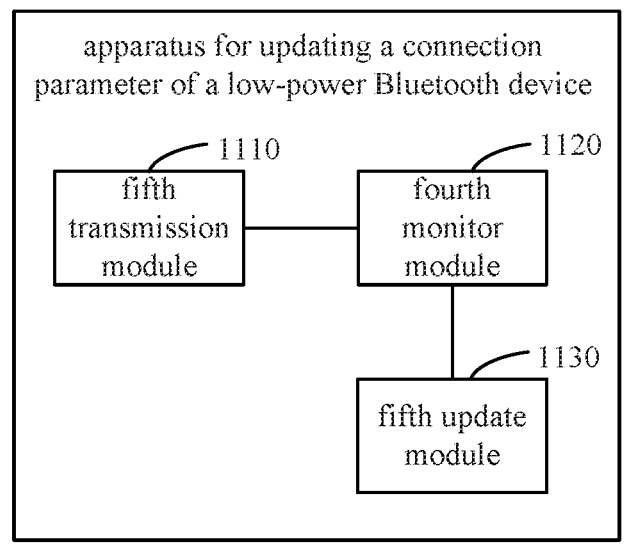
FIG. 13 is another block diagram illustrating an apparatus for updating a connection parameter of a low-power Bluetooth device according to an exemplary embodiment.

FIG. 13 is another block diagram illustrating an apparatus for updating a connection parameter of a low-power Bluetooth device according to an exemplary embodiment. The apparatus is applied to a Bluetooth remote control device that is communicatively connected with a controlled device. The apparatus includes a fifth transmission module 1110 configured to transmit, to the controlled device, a request for updating a connection parameter upon detection of a local switch of remote control modes.

The apparatus shown in FIG. 13 also includes a fourth monitor module 1120 configured to monitor, for every Connection Interval after the local switch of remote control modes, whether a response for agreeing to update the connection parameter transmitted by the controlled device is received locally. A valid time for the connection parameter is carried in the response, and is earlier than a default valid time.

The apparatus shown in FIG. 13 also includes a fifth update module 1130 configured to update, after the response is received, the connection parameter between the Bluetooth remote control device and the controlled device, when the valid time for the connection parameter arrives.

It can be seen from the above embodiments that whether the connection parameter is updated may be determined by detecting the remote control mode of the Bluetooth remote control device. Upon detection of a switch of remote control modes, a request for updating the connection parameter may be transmitted to the controlled device immediately and a related dialog from the controlled device may be monitored at every Connection Interval. In the disclosed embodiments, by improving the response speed of the Bluetooth remote control device, the speed of updating the connection parameter may be improved.

Corresponding to the embodiment for updating the connection parameter that may be applied to the controlled device, as illustrated in FIG. 6, the present disclosure also provides an apparatus for updating the connection parameter that may be applied to the controlled device.

Figure 14:
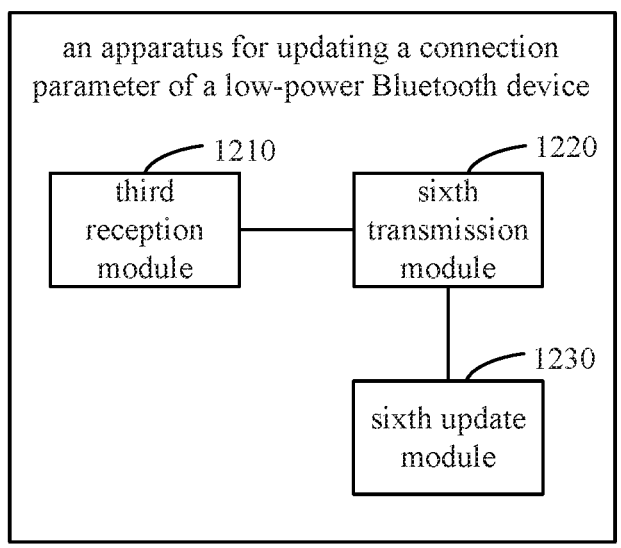
FIG. 14 is another block diagram illustrating an apparatus for updating a connection parameter of a low-power Bluetooth device according to an exemplary embodiment.

FIG. 14 is another block diagram illustrating an apparatus for updating a connection parameter of a low-power Bluetooth device according to an exemplary embodiment. The apparatus may be applied to a controlled device that is communicatively connected with a Bluetooth remote control device. The apparatus includes a third reception module 1210 configured to receive a request for updating a connection parameter transmitted by the Bluetooth remote control device.

The apparatus shown in FIG. 14 also includes a sixth transmission module 1220 configured to transmit, to the Bluetooth remote control device, a response for agreeing to update the connection parameter, based on the request for updating the connection parameter. A valid time for the connection parameter is carried in the response, and is earlier than a default valid time.

The apparatus shown in FIG. 12 further includes a sixth update module 1230 configured to update the connection parameter between the controlled device and the Bluetooth remote control device, when the valid time for the connection parameter arrives.

In the disclosed embodiments, the connection parameter may be quickly updated by bringing forward the valid time for the connection parameter.

For embodiments of an apparatus, since they substantially correspond to embodiments of a method, descriptions of a certain part of the method may be referred to as descriptions of functions being performed by a relevant part of the apparatus. The above-described embodiments of a device or apparatus are for illustrative purposes only. Elements described as separate components may or may not be physically separated, and components illustrated as modules may or may not be physical elements (i.e., these components may be located at the same place, or may be distributed in several network elements). Some or all of the modules may be configured to realize the purposes of the schemes of the present disclosure according to actual needs. Those of ordinary skill in the art will now be able to understand and practice the disclosed schemes without creative efforts.

Accordingly, an apparatus for updating a connection parameter of a low-power Bluetooth device is provided. The apparatus includes a processor and a memory for storing processor-executable instructions. The processor is configured to: transmit, to a controlled device, a prompt message indicating a switch of remote control modes in a Bluetooth remote control device, upon detection of a local switch of remote control modes, such that a request for updating a connection parameter is generated by the controlled device based on the prompt message and transmitted to the Bluetooth remote control device. A valid time for the connection parameter is carried in the request for updating the connection parameter, and is earlier than a default valid time. The processor is also configured to monitor, for every connection interval Connection Interval after the local switch of remote control modes, whether the request for updating the connection parameter transmitted by the controlled device is received locally. The processor is also configured to transmit, to the controlled device, a response for agreeing to update the connection parameter, upon detection of the request for updating the connection parameter. In addition, the processor is configured to update the connection parameter between the Bluetooth remote control device and the controlled device, when the valid time for the connection parameter arrives.

Accordingly, an apparatus for updating a connection parameter of a low-power Bluetooth device is provided. The apparatus includes a processor and a memory for storing processor-executable instructions. The processor is configured to: receive a prompt message transmitted by a Bluetooth remote control device, wherein the prompt message indicates a switch of remote control mode in the Bluetooth remote control device. The processor is also configured to generate, based on the prompt message, a request for updating a connection parameter and transmit the request to the Bluetooth remote control device, wherein a valid time for the connection parameter is carried in the request for updating the connection parameter, and is earlier than a default valid time. The processor is also configured to receive a response for agreeing to update the connection parameter transmitted by the Bluetooth remote control device, and update the connection parameter between a controlled device and the Bluetooth remote control device, when the valid time for the connection parameter arrives.

Accordingly, an apparatus for updating a connection parameter of a low-power Bluetooth device is provided. The apparatus includes a processor and a memory for storing processor-executable instructions. The processor is configured to: transmit, to a controlled device, a request for updating a connection parameter, upon detection of a local switch of remote control modes. The processor is also configured to monitor, for every Connection Interval after the local switch of remote control modes, whether a response for agreeing to update the connection parameter transmitted by the controlled device is received locally. A valid time for the connection parameter is carried in the response, and is earlier than a default valid time. The processor is further configured to update, after the response is received, the connection parameter between the Bluetooth remote control device and the controlled device, when the valid time for the connection parameter arrives.

Accordingly, an apparatus for updating a connection parameter of a low-power Bluetooth device is provided. The apparatus includes a processor and a memory for storing processor-executable instructions. The processor is configured to: receive a request for updating a connection parameter transmitted by a Bluetooth remote control device, and transmit, to the Bluetooth remote control device, a response for agreeing to update the connection parameter, based on the request for updating the connection parameter. A valid time for the connection parameter is carried in the response, and is earlier than a default valid time. The processor is further configured to update the connection parameter between a controlled device and the Bluetooth remote control device, when the valid time for the connection parameter arrives.

Figure 15:
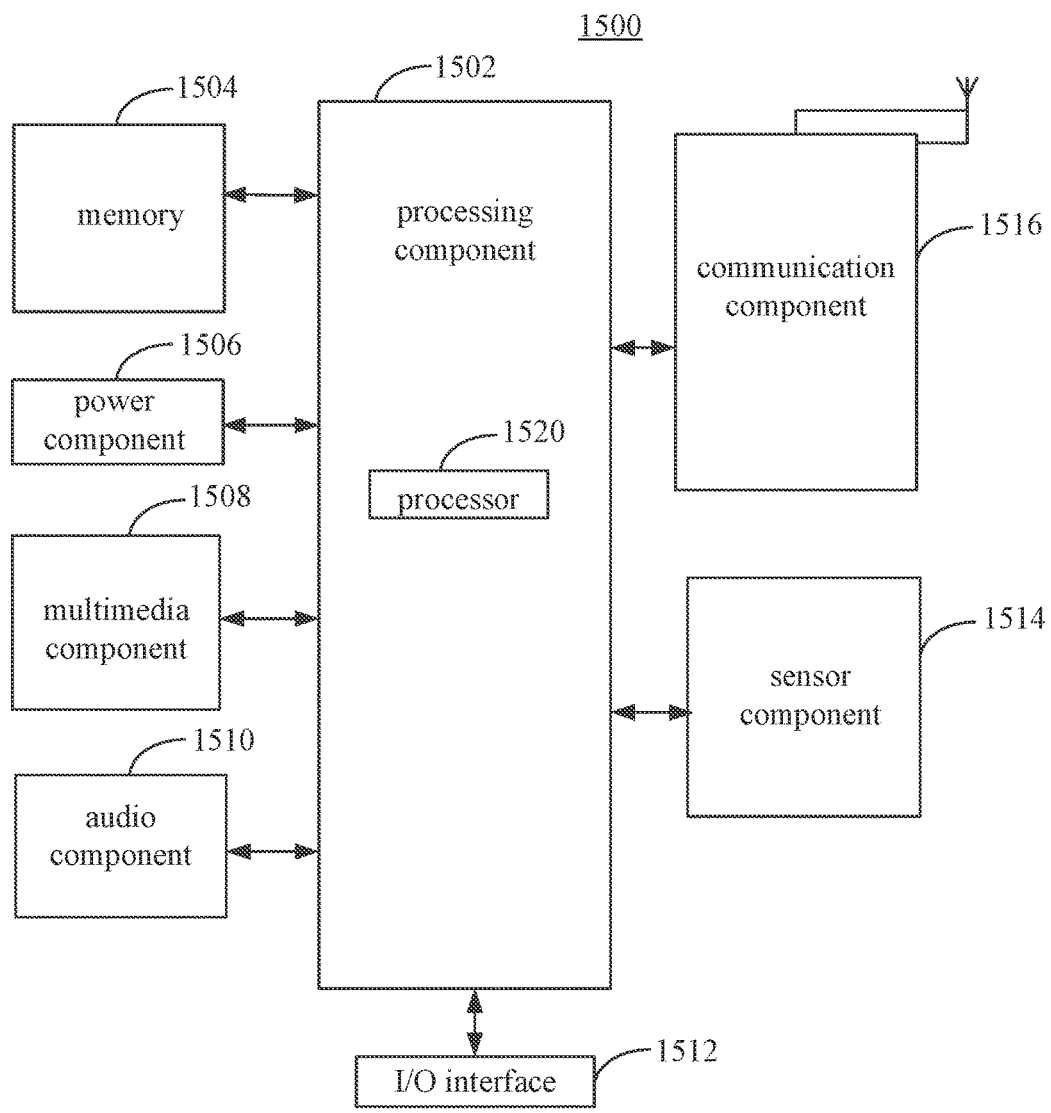
FIG. 15 is a structure block diagram illustrating an apparatus for updating a connection parameter of a low-power Bluetooth device according to an exemplary embodiment.

FIG. 15 is a structure block diagram illustrating an apparatus or device 1500 for updating a connection parameter of a low-power Bluetooth device according to an exemplary embodiment. Apparatus 1500 may be a Bluetooth remote control device or part of a Bluetooth remote control device. Alternatively or additionally, apparatus 1500 may be a controlled device or part of a controlled device communicatively connected with a Bluetooth remote control device. Apparatus 1500 may be a mobile phone, a computer, a digital broadcasting terminal, a messaging device, a game console, a tablet device, medical equipment, fitness equipment, a personal digital assistant, an aircraft and the like.

Referring to FIG. 15, apparatus 1500 includes one or more of the following components: a processing component 1502, a memory 1504, a power component 1506, a multimedia component 1508, an audio component 1510, an input/output (I/O) interface 1512, a sensor component 1514, and a communication component 1516.

Processing component 1502 is configured to control overall operations of apparatus 1500, such as the operations associated with display, telephone calls, data communications, camera operations, and recording operations. Processing component 1502 includes one or more processors 1520 configured to execute instructions to perform all or part of the steps included in the above-described methods. In some embodiments, processing component 1502 may include one or more modules configured to facilitate the interaction between the processing component 1502 and other components. For example, processing component 1502 may include a multimedia module configured to facilitate the interaction between multimedia component 1508 and processing component 1502.

Memory 1504 is configured to store various types of data to support the operation of apparatus 1500. Examples of such data include instructions for any applications or methods operated on or performed by apparatus 1500, contact data, phonebook data, messages, pictures, video, etc. Memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Power component 1506 is configured to provide power to various components of apparatus 1500. Power component 1506 may include a power management system, one or more power sources, and any other components associated with the generation, management, and distribution of power in apparatus 1500.

Multimedia component 1508 includes a screen providing an output interface between apparatus 1500 and the user. In some embodiments, the screen may include a liquid crystal display and a touch panel. If the screen includes the touch panel, the screen may be implemented as a touch screen to receive input signals from the user. The touch panel may include one or more touch sensors configured to sense touches, swipes, and gestures on the touch panel. The touch sensors may sense not only a boundary of a touch or swipe action, but also a period of time and a pressure associated with the touch or swipe action. In some embodiments, multimedia component 1508 may include a front camera and/or a rear camera. The front camera and the rear camera may receive an external multimedia datum while apparatus 1500 is in an operation mode, such as a photographing mode or a video mode. Each of the front camera and the rear camera may be a fixed optical lens system or may have focus and/or optical zoom capabilities.

Audio component 1510 is configured to output and/or input audio signals. For example, audio component 1510 may include a microphone configured to receive an external audio signal when apparatus 1500 is in an operation mode, such as a call mode, a recording mode, and a voice recognition mode. The received audio signal may be further stored in memory 1504 or transmitted via communication component 1516. In some embodiments, audio component 1510 further includes a speaker configured to output audio signals.

I/O interface 1512 is configured to provide an interface between processing component 1502 and peripheral interface modules, such as a keyboard, a click wheel, buttons, and the like. The buttons may include, but are not limited to, a home button, a volume button, a starting button, and a locking button.

Sensor component 1514 may include one or more sensors configured to provide status assessments of various aspects of apparatus 1500. For example, sensor component 1514 may detect at least one of an open/closed status of apparatus 1500, relative positioning of components, e.g., the display and the keypad, of apparatus 1500, a change in position of apparatus 1500 or a component of apparatus 1500, a presence or absence of user contact with apparatus 1500, an orientation or an acceleration/deceleration of apparatus 1500, and a change in temperature of apparatus 1500. Sensor component 1514 may include a proximity sensor configured to detect the presence of nearby objects without any physical contact. Sensor component 1514 may also include a light sensor, such as a CMOS or CCD image sensor, for use in imaging applications. In some embodiments, sensor component 1514 may also include an accelerometer sensor, a gyroscope sensor, a magnetic sensor, a pressure sensor, or a temperature sensor.

Communication component 1516 is configured to facilitate wired or wireless communication between apparatus 1500 and other devices. Apparatus 1500 can access a wireless network based on a communication standard, such as WiFi, 2G or 3G, 4G or a combination thereof. In some embodiments, communication component 1516 receives a broadcast signal or broadcast associated information from an external broadcast management system via a broadcast channel. In some embodiments, communication component 1516 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or any other suitable technologies.

In some embodiments, apparatus 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as those included in memory 1504, executable by processor 1520 of apparatus 1500, for performing the above-described methods. For example, the non-transitory computer-readable storage medium may be a ROM, a RAM, a CD-ROM, a magnetic tape, a floppy disc, an optical data storage device, and the like.

Although features and elements are described above in particular combinations, one of ordinary skill in the art will appreciate that each feature or element may be used alone, or in any combination with the other feature and elements if no contradiction exists.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

The above description may be regarded as preferred embodiments of the disclosure only, and are not intended to limit the disclosure. All modifications, equivalent substitutions, and improvements that fall within the spirit and principles of the disclosure should be included in the scope of protection of this disclosure.

What is claimed is:

1. A method for updating a connection parameter of a low-power Bluetooth device, wherein the method is performed by a Bluetooth remote control device that is communicatively connected with a controlled device, the method comprises:
   upon detection of a local switch of remote control modes, transmitting, to the controlled device, a prompt message indicating the local switch of remote control modes in the Bluetooth remote control device, such that a request for updating a connection parameter is generated by the controlled device based on the prompt message and transmitted to the Bluetooth remote control device, wherein a valid time for updating the connection parameter is carried in the request for updating the connection parameter, and is earlier than a default valid time;
   monitoring, for every connection interval Connection Interval after the local switch of remote control modes, whether the request for updating the connection parameter transmitted by the controlled device is received locally;
   upon detection of the request for updating the connection parameter, transmitting, to the controlled device, a response for agreeing to update the connection parameter; and
   updating the connection parameter between the Bluetooth remote control device and the controlled device, when the valid time for updating the connection parameter arrives.

2. The method according to claim 1,
   wherein the detection of the local switch of remote control modes comprises detecting a local switch to a voice remote control mode, and
   wherein updating the connection parameter between the Bluetooth remote control device and the controlled device upon detection of the local switch to the voice remote control mode comprises:
   shortening the connection interval between the Bluetooth remote control device and the controlled device to a first predetermined duration.

3. The method according to claim 2, wherein the local switch to the voice remote control mode is realized by pressing a button for voice control, and the method further comprises:
   upon detection of a release of the button for voice control, transmitting, to the controlled device, a prompt message indicating that the button for voice control has been released, such that a first request for updating the connection parameter to a previous value is generated by the controlled device based on the prompt message and transmitted to the Bluetooth remote control device, wherein the valid time for updating the connection parameter is carried in the first request for updating the connection parameter, and is earlier than the default valid time;
   monitoring, for every connection interval in a second predetermined duration after the release of the button for voice control, whether the first request transmitted by the controlled device is received locally;
   upon detection of the first request, transmitting, to the controlled device, a response for agreeing to update the connection parameter; and
   updating the connection parameter between the Bluetooth remote control device and the controlled device to the previous value, when the valid time for updating the connection parameter carried in the first request arrives.

4. The method according to claim 2, wherein the local switch to the voice remote control mode is realized by pressing a button for voice control, and the method further comprises:
   upon detection of a release of the button for voice control, transmitting, to the controlled device, a second request for updating the connection parameter to a preset value;
   monitoring, for every connection interval in a second predetermined duration after the release of the button for voice control, whether a response for agreeing to update the connection parameter to the preset value transmitted by the controlled device is received locally, wherein the valid time for updating the connection parameter is carried in the response, and is earlier than the default valid time; and
   updating, after the response for agreeing to update the connection parameter to the preset value transmitted by the controlled device is received, the connection parameter between the Bluetooth remote control device and the controlled device to the preset value, when the valid time carried in the response arrives.

5. The method according to claim 1,
   wherein the detection of the local switch of remote control modes comprises detecting a local switch to a button remote control mode, and
   wherein updating the connection parameter between the Bluetooth remote control device and the controlled device upon detection of the local switch to the button remote control mode comprises:
   extending the connection interval between the Bluetooth remote control device and the controlled device to a third predetermined duration.

6. A method for updating a connection parameter of a low-power Bluetooth device, wherein the method is performed by a Bluetooth remote control device that is communicatively connected with a controlled device, the method comprises:
   upon detection of a local switch of remote control modes, transmitting, to the controlled device, a request for updating a connection parameter;
   monitoring, for every connection interval Connection Interval after the local switch of remote control modes, whether a response for agreeing to update the connection parameter transmitted by the controlled device is received locally, wherein a valid time for updating the connection parameter is carried in the response, and is earlier than a default valid time; and updating, after the response is received, the connection parameter between the Bluetooth remote control device and the controlled device, when the valid time for updating the connection parameter arrives.

7. An apparatus for updating a connection parameter of a low-power Bluetooth device, wherein the apparatus is applied to a Bluetooth remote control device that is communicatively connected with a controlled device, the apparatus comprises:
a memory for storing processor-executable instructions; and
a processor configured for executing the instructions to:
upon detection of a local switch of remote control modes, transmit, to the controlled device, a prompt message indicating the local switch of remote control modes in the Bluetooth remote control device, such that a request for updating a connection parameter is generated by the controlled device based on the prompt message and transmitted to the Bluetooth remote control device, wherein a valid time for updating the connection parameter is carried in the request for updating the connection parameter, and is earlier than a default valid time;
monitor, for every connection interval Connection Interval after the local switch of remote control modes, whether the request for updating the connection parameter transmitted by the controlled device is received locally;
upon detection of the request for updating the connection parameter, transmit, to the controlled device, a response for agreeing to update the connection parameter; and
update the connection parameter between the Bluetooth remote control device and the controlled device, when the valid time for updating the connection parameter arrives.

8. The apparatus according to claim 7,
wherein detection of the local switch of remote control modes comprises detecting a local switch to a voice remote control mode, and
wherein the processor is further configured to execute the instructions to:
upon detection of the local switch to the voice remote control mode, shorten the connection interval between the Bluetooth remote control device and the controlled device to a first predetermined duration.

9. The apparatus according to claim 8, wherein the local switch to the voice remote control mode is realized by pressing a button for voice control, and the processor is further configured to execute the instructions to:
upon detection of a release of the button for voice control, transmit, to the controlled device, a prompt message indicating that the button for voice control has been released, such that a first request for updating the connection parameter to a previous value is generated by the controlled device based on the prompt message and transmitted to the Bluetooth remote control device, wherein the valid time for updating the connection parameter is carried in the first request for updating the connection parameter, and is earlier than the default valid time;
monitor, for every connection interval in a second predetermined duration after the release of the button for voice control, whether the first request transmitted by the controlled device is received locally;
transmit, to the controlled device, a response for agreeing to update the connection parameter upon detection of the first request; and
update the connection parameter between the Bluetooth remote control device and the controlled device to the previous value, when the valid time for updating the connection parameter carried in the first request arrives.

10. The apparatus according to claim 8, wherein the local switch to the voice remote control mode is realized by pressing a button for voice control, and wherein the processor is further configured to execute the instructions to:
transmit, to the controlled device, a second request for updating the connection parameter to a preset value upon detection of a release of the button for voice control;
monitor, for every connection interval in a second predetermined duration after the release of the button for voice control, whether a response for agreeing to update the connection parameter to the preset value transmitted by the controlled device is received locally, wherein the valid time for updating the connection parameter is carried in the response, and is earlier than the default valid time; and
update, after the response for agreeing to update the connection parameter to the preset value transmitted by the controlled device is received, the connection parameter between the Bluetooth remote control device and the controlled device to the preset value, when the valid time carried in the response arrives.

11. The apparatus according to claim 7,
wherein detection of the local switch of remote control modes comprises detecting a local switch to a button remote control mode, and
wherein the processor is further configured to execute the instructions to:
upon detection of the local switch to the button remote control mode, extend the connection interval between the Bluetooth remote control device and the controlled device to a second predetermined duration.

12. An apparatus for updating a connection parameter of a low-power Bluetooth device, wherein the apparatus is applied to a Bluetooth remote control device that is communicatively connected with a controlled device, the apparatus comprises:
a memory for storing processor-executable instructions; and
a processor configured to execute the instructions to:
transmit, to the controlled device, a request for updating a connection parameter upon detection of a local switch of remote control modes;
monitor, for every connection interval Connection Interval after the local switch of remote control modes, whether a response for agreeing to update the connection parameter transmitted by the controlled device is received locally, wherein a valid time for updating the connection parameter is carried in the response, and is earlier than a default valid time; and
update, after the response is received, the connection parameter between the Bluetooth remote control device and the controlled device, when the valid time for updating the connection parameter arrives.

13. A non-transitory computer-readable storage medium having stored therein a computer program including instructions that, when executed by a processor, cause the processor to perform a method according to claim 1.

14. The non-transitory computer-readable storage medium according to claim 13,
wherein the detection of the local switch of remote control modes comprises detecting a local switch to a voice remote control, and wherein updating the connection parameter between the Bluetooth remote control device and the controlled device upon detection of the local switch to the voice remote control mode comprises:
shortening the connection interval between the Bluetooth remote control device and the controlled device to a first predetermined duration.

15. The non-transitory computer-readable storage medium according to claim 14, wherein the local switch to the voice remote control mode is realized by pressing a button for voice control, and the method further comprises:
upon detection of a release of the button for voice control, transmitting, to the controlled device, a prompt message indicating that the button for voice control has been released, such that a first request for updating the connection parameter to a previous value is generated by the controlled device based on the prompt message and transmitted to the Bluetooth remote control device, wherein the valid time for updating the connection parameter is carried in the first request for updating the connection parameter, and is earlier than the default valid time;
monitoring, for every connection interval in a second predetermined duration after the release of the button for voice control, whether the first request transmitted by the controlled device is received locally;
transmitting, to the controlled device, a response for agreeing to update the connection parameter, upon detection of the first request; and
updating the connection parameter between the Bluetooth remote control device and the controlled device to the previous value, when the valid time for updating the connection parameter carried in the first request arrives.

16. The non-transitory computer-readable storage medium according to claim 14, wherein the local switch to the voice remote control mode is realized by pressing a button for voice control, and the method further comprises:
upon detection of a release of the button for voice control, transmitting, to the controlled device, a second request for updating the connection parameter to a preset value;
monitoring, for every connection interval in a second predetermined duration after the release of the button for voice control, whether a response for agreeing to update the connection parameter to the preset value transmitted by the controlled device is received locally, wherein the valid time for updating the connection parameter is carried in the response, and is earlier than the default valid time; and
updating, after the response for agreeing to update the connection parameter to the preset value transmitted by the controlled device is received, the connection parameter between the Bluetooth remote control device and the controlled device to the preset value, when the valid time carried in the response arrives.

17. The non-transitory computer-readable storage medium according to claim 13,
wherein the detection of the local switch of remote control modes comprises detecting a local switch to a button remote control mode, and
wherein updating the connection parameter between the Bluetooth remote control device and the controlled device upon detection of the local switch to the button remote control mode comprises:
lengthening the connection interval between the Bluetooth remote control device and the controlled device to a third predetermined duration.

18. A non-transitory computer-readable storage medium having stored therein a computer program including instructions that, when executed by a processor, cause the processor to perform a method for updating a connection parameter of a low-power Bluetooth device according to claim 6.

\* \* \* \* \*